Sept. 26, 1950          R. P. SHEA          2,523,396
ANTIFRICTION MOUNT

Filed Aug. 30, 1946          2 Sheets—Sheet 1

INVENTOR.
ROBERT P. SHEA,
BY
Robert W. Fulwider
ATTORNEY.

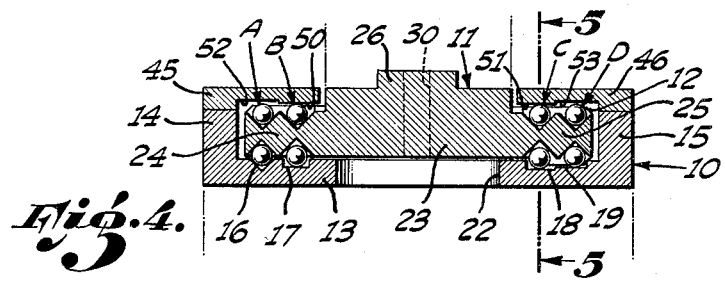
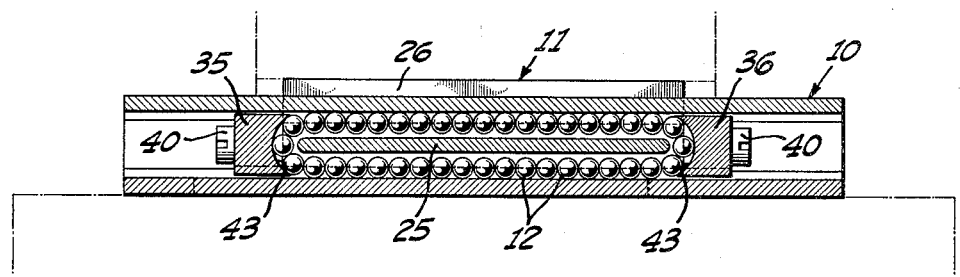
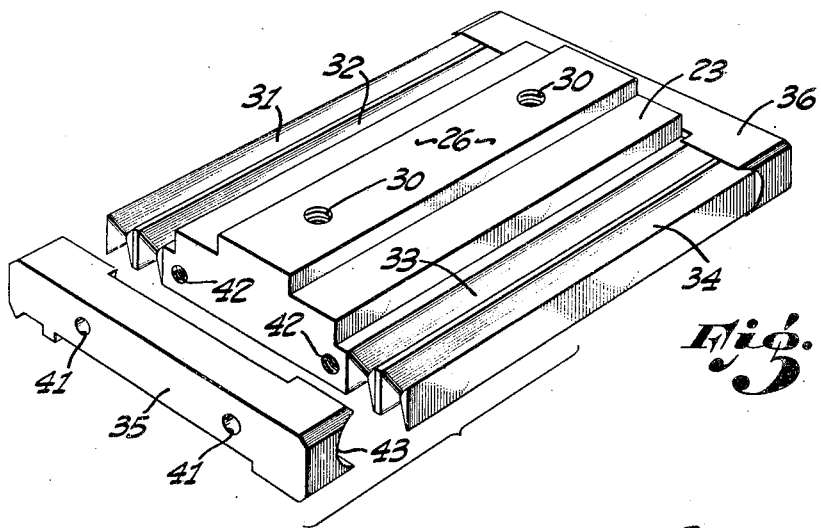

Patented Sept. 26, 1950

2,523,396

UNITED STATES PATENT OFFICE 2,523,396

ANTIFRICTION MOUNT

Robert P. Shea, North Hollywood, Calif., assignor to Edward Furer, Burbank, Calif.

Application August 30, 1946, Serial No. 694,010

3 Claims. (Cl. 308—6)

The present invention relates generally to movable carriages for machine elements, and more particularly to carriages supported on anti-friction balls or rollers running in grooved raceways.

In various types of precision machines embodying a carriage supported for translatory movement and in which the carriage must be moved while the machine is in operation, it is essential that the travel of the carriage be as smooth and effortless as possible and free from all vibration or chatter, even when heavily loaded. Precision machine tools, for example, require the utmost rigidity and smoothness of operation for the movable tool heads or work beds, since the slightest vibration or play results in undesirable surface irregularities in the work. Physical instruments such as seismographs, astronomical equipment, and optical and electronic microscopes also require extremely smooth and accurate linear movements, as the limitations on the apparatus are, to a large extent, traceable to the inaccuracies in the movable elements.

The particular machine for which the present invention was primarily developed, however, is the motion picture optical printer which comprises a projector, camera, and optical system, all mounted on a common supporting structure. In this machine, a print of the film exposed on the studio set or location in the regular camera is run through the projector and is projected through the optical system onto raw film running through the camera. Among the many effects obtainable by operation of the machine is the "zoom" shot, in which the camera appears to move up from a medium distance shot to a close-up, or vice versa, while the action is taking place. Such effects, while usually made at the time of taking by moving the camera up to the subjects on a truck or traveling boom, can also be produced in the optical printer from film taken at a fixed camera position, thereby eliminating expensive retakes, or making it possible to get the desired effect in a scene which could not be duplicated at any cost. This zoom shot effect is accomplished by progressively moving the objective lens of the optical system toward the film in the projector, while at the same time moving the printer camera back to maintain the image in focus. In this way, an increasingly smaller portion of the original frame is enlarged to fill the print frame, and the final result is practically indistinguishable from a conventionally made zoom shot. Because of the extreme magnification during projection of the picture onto a distant screen, the slightest errors become objectionably noticeable, and satisfactory zoom effects can therefore be made only if the objective lens and camera are supported on carriages capable of smooth, effortless operation and entirely free from vibration and chatter.

Movable carriages which slide on ways are objectionable for the purposes because of their relatively high frictional resistance. Dolly-type carriages, mounted on small wheels offer much less resistance to movement, but bearing play permits small erratic deviations from the desired path of travel. Carriages mounted on balls running in grooves overcome these difficulties but, as heretofore constructed, have required a large number of balls and bulky retainers for them if the distance traveled was substantially longer than the length of the carriage. The reason for this will be apparent from a short analysis of the movement of ball or roller supported carriages.

As the carriage travels forward, the balls rotate beneath it and move in the same direction. In one complete revolution, each ball moves forward along the tracks a distance equal to its own circumference. At the same time, the carriage is moved an equal distance relative to the balls by the rolling action of the balls on the bottom of the carriage. The translation of the carriage relative to the track, therefore, is equal to the movement of the balls relative to the track plus the movement of the carriage relative to the balls. Thus, the carriage moves forward a distance equal to twice the circumference of the ball for each ball revolution. From this it will be seen that the carriage tends to move off its rolling supports as it progresses unless additional balls are located in its path. If the carriage is to be fully supported at all times it must have before it sufficient balls to cover half the path of travel, and in order to confine the balls, it is necessary to provide an extension on the carriage reaching forwardly a distance equal to half the length of travel. Provision must then be made for clearance of the extension when the carriage is in its most forward position, and the overall space required for the installation becomes objectionably long. Furthermore, different size carriages must be constructed for each installation having a different length of travel.

The present invention overcomes this disadvantage by providing raceways in the carriage which remove the balls left in the trail of the carriage as it travels forwardly, and which return them to positions directly in the path of movement. It is further proposed, in one embodiment of my invention to provide ball bearings and raceways on the top side of the carriage as well as on the bottom side thereof so as to preload the supporting balls to constrain the carriage against vertical displacement.

In view of the foregoing, one of the principal objects of my invention is to provide a movable mount having a ball or roller supported platform or carriage which is compact and not appreciably larger than a conventional sliding carriage mount of the same load carrying capacity.

Another object is to provide a movable mount including a ball or roller supported carriage utilizing a fixed small number of balls regardless of the length of its travel.

A further object of the invention is to provide a movable mount of the class described wherein the carriage is confined between preloaded balls or rollers which hold it to a linear path.

Still another object is to provide a movable mount with a ball or roller supported platform in which the races are enclosed and protected against the entry of foreign matter likely to result in unsatisfactory operation or damage to the machine.

These and other objects and advantages of the present invention will become apparent from the following description of the preferred embodiment thereof, reference being had to the accompanying drawings, in which:

Figure 4 is a transverse sectional view taken along the line 4—4 in Figure 3;

Figure 5 is a longitudinal section taken along the line designated 5—5 in Figure 4; and Figure 6 is a perspective view of the carriage assembly with one end detached.

Figure 1:
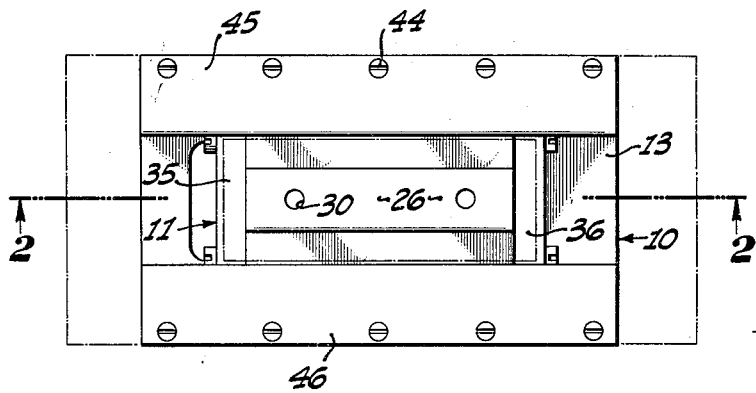
Figure 1 is a plan view of a ball bearing supported movable mount constructed in accordance with the principles of my invention.
Figure 2:
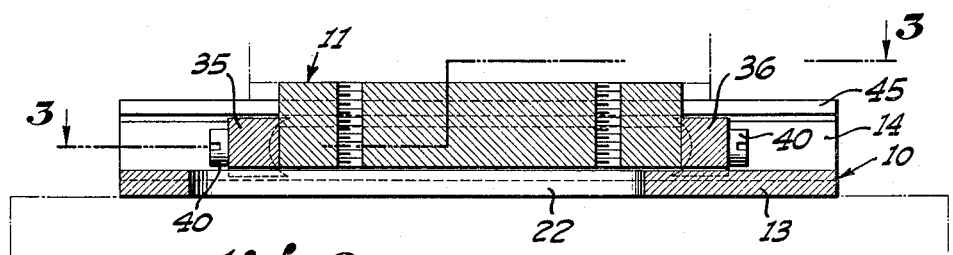
Figure 2 is a vertical longitudinal section of the same taken along line 2—2 in Figure 1.
Figure 3:
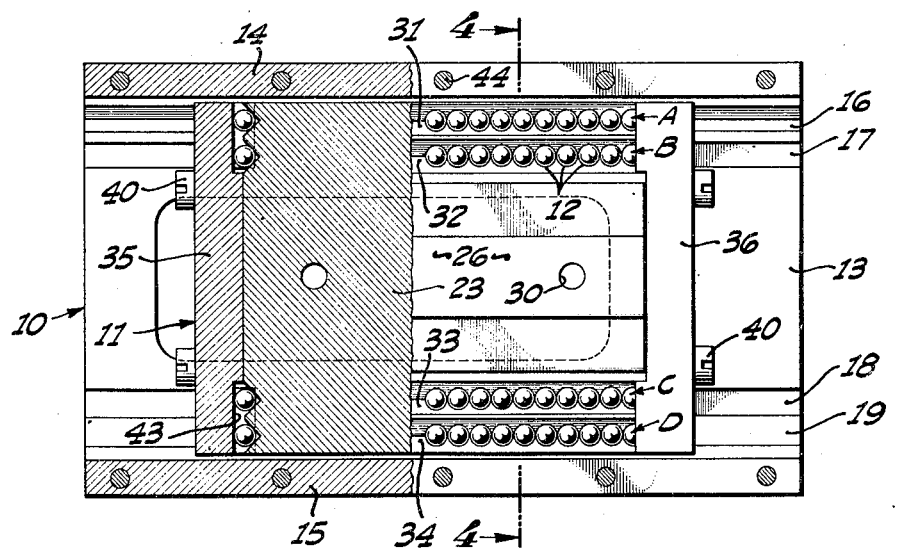
Figure 3 is another plan view with a portion of the carriage and stationary bed shown in horizontal section along line 3—3 in Figure 2, a fragment of the cover plate being removed to reveal the balls in their races.

As shown in the drawings, the preferred embodiment of my invention has for its principal parts a stationary bed 10, a movable carriage 11, and a plurality of balls 12 which are carried with the movable carriage to provide a rolling support therefor, and which travel in raceways designated generally by the reference characters A, B, C, and D. While I have shown and described herein a construction utilizing balls for the rolling support of the carriage, it is to be understood that the invention is not limited solely to the use of balls, but that rolling elements in the shape of any closed surface of revolution might be used.

The stationary bed 10 is in the form of a channel shaped member having a flat-bottomed base portion 13 with integral side walls 14 and 15 projecting upwardly from the right and left hand edges thereof along its full length. The length of the bed 10 is determined by the length of travel of the carriage 11, and in all cases extends a sufficient distance so that the carriage is entirely supported thereon at the extremities of its travel. The transverse distance between the inner faces of these side walls is slightly greater than the width of the carriage 11 in order to provide clearance for the latter. The top surface of the base portion 13 is formed with four laterally spaced, longitudinally extending grooves 16, 17, 18, and 19, which serve as the bottom races of raceways A, B, C, and D, respectively. These grooves may be of any suitable configuration for a particular application and, in the preferred arrangement shown, the extreme left hand groove 16 is V-shaped in cross section, while the other three have flat plane bottoms for certain practical considerations which will be pointed out presently. Two of the grooves, 16 and 17, are located on the left hand side of the top surface of the base portion 13 adjacent to the inner surface of side wall 14, and the other two grooves, 18 and 19, are located on the right hand side adjacent to the inner surface of side wall 15. The central portion of the base 11, located between the two pairs of longitudinal grooves, is preferably formed with a cut-out 22 in order to permit ready access to the bottom of movable carriage 11. The two inner grooves 17 and 18 are of the same depth and their bottom surfaces lie in the same horizontal plane, while the outer right hand groove 19 is slightly shallower and therefore stands at a higher level for reasons which will become apparent hereinafter.

The movable carriage 11 comprises a base portion or platform 23 having laterally projecting flanges 24 and 25 along its sides, and a raised rib 26 along its longitudinal mid-section to which the machine element involved may be attached. The carriage 11 is pierced through the rib portion 26 by two longitudinally spaced, vertically disposed screw threaded holes 30 adapted to receive threaded attachment bolts (not shown) by which the machine element is secured to the carriage.

The side flanges of the carriage 11 are provided with four laterally spaced, V-shaped grooves 31, 32, 33 and 34, two of which are located on the left hand flange 24 and the other two being located on the right hand flange 25. These grooves extend continuously around the flange, being formed in the top and bottom surfaces thereof and connected at their ends by smoothly machined notches, as best shown in Figure 6. The top course of each of the grooves is parallel with and lies directly above its bottom course, and both courses of each groove lie in a vertical plane passing through one of the raceways A, B, C, and D. Cap strips 35 and 36 are secured to the ends of the carriage 11 by screws 40 which pass through holes 41 and are received within threaded holes 42 in the carriage. The end portions of the cap strips 35, 36 are shaped to provide concave cylindrical faces 43 which cooperate with the groove-connecting notches in the ends of the flanges to form vertical courses for the raceways A, B, C and D, along which the balls 12 are raised from the top course to the bottom course thereof and vice versa.

Mounted on top of the two side walls 14, 15 of the bed 10 and secured thereto by countersunk screws 44 are inwardly projecting ledges or cover plates 45 and 46 which overhang the flanges 24, 25 of the carriage 11 when the latter is assembled with the bed. The ledges 45, 46 extend the entire length of the bed 10 and cover the grooves in the base portion 13 thereof, shielding the same from falling dirt or other objects which might cause damage to the raceways or balls. The bottom surfaces of the two cover plates 45, 46 are machined to provide two flat lands 50 and 51 which are disposed to lie directly above the grooves 17, 18 of the stationary bed 10 and grooves 32, 33 of the carriage 11. Laterally outward of the lands 50, 51, the cover plates are recessed to form shallow channels 52 and 53 which are disposed directly above grooves 16 and 19 of the bed 10 and grooves 31 and 34 of the carriage 11. Since the bottom surfaces of the channels 52, 53 stand at a slightly higher level than the lands 50, 51, there is a slight amount of clearance provided for the balls 12 in the top course of the raceways A and D and in consequence the balls in this portion of the raceway do not support any part of the load. The lands 50, 51, on the other hand, being at a lower level, engage the balls in the inner raceways B and C and exert a downward thrust thereon, the amount of such thrust being governed by the proportions of the several parts. The situation is reversed in the lower course of the raceways, however, with the balls in the outer raceways A and D carrying the load and those in the inner raceways B and C rolling free due to clearance resulting from the fact that the bottoms of the channels 17 and 18 lie at a lower level than that of the outer right hand channel 19. Each of the four raceways A, B, C and D is completely filled with balls 12 as illustrated in Figure 5. As the carriage moves over the stationary bed, the balls in each raceway roll in a closed path around the flanges 24, 25 of the carriage, being confined at the ends of the carriage by the cap strips 35, 36 whose concave inner faces divert the balls around the ends of the flanges in an upward or downward direction as the case may be.

The particular functions of the several raceways will best be understood by reference to Figure 4 in which the four raceways are shown in transverse section. It will be noted that the balls in the two outer raceways A and D serve primarily to support the load of the carriage whereas the balls in the inner raceways B and C function to preload the balls in raceways A and D by applying a downward thrust thereon, preventing the carriage from being raised off the ways of the stationary bed by foreign matter or upward thrust forces. The bottom run of the extreme left hand raceway A is seen to comprise two opposed V-shaped grooves 31 and 16 which cooperate with the balls 12 to prevent lateral wandering of the carriage to the right or left as it moves along the ways. It is also contemplated that a movable carriage might be designed with several raceways of opposed V-shaped grooves running parallel to one another but such a construction presents a difficult machining problem due to the extreme dimensional accuracy required, and the increased cost of manufacture will usually not be justified by the results. Accordingly, the preferred embodiment utilizes only the one stationary track of V-shaped section, the other stationary tracks being merely flat plane surfaces which permit the balls to travel along any laterally located path to which they are constrained by the V-shaped race.

A clearer concept of the way the balls 12 roll in their respective raceways may be had by imagining that one is observing the track and carriage from one end and that the carriage is moving toward the observer with a given velocity. Since the moving carriage 11 carries the balls 12 with it, all of them are necessarily moving toward the observer. Those in different grooves are, however, moving at different velocities relative to the stationary bed 10, and to the carriage 11.

The balls in the bottom course of the outer raceways A and D, bearing the load of the carriage 11, roll forward with the carriage but at only half its speed. Therefore, as the carriage 11 advances, the balls move rearwardly relative to the carriage, and when one of the balls reaches the rear end of its raceway it is scooped up by the lower projecting edge of the concave inner surface 43 of the end plate and is lifted through the end notch to the upper course. Pressure from the following balls causes each ball in the upper course to move forwardly relative to the carriage at the same velocity as the balls in the bottom course move rearwardly, hence the balls in the upper course move forwardly relative to the stationary bed 10 at a velocity equal to 1½ times the velocity of the carriage itself. The balls in the upper courses of raceways A and D continue to move forwardly at this rate until they reach the front end of the raceway, where they descend through the notches to reenter the lower courses. Each ball repeats this trip around the carriage flange as many times as may be necessary, making one complete trip each time the carriage moves forward a distance equal to four times the length of the carriage.

It will be noted from the foregoing that the balls in the outer raceways A and D move rearwardly relative to the carriage 11 in the lower courses and forwardly in the upper courses. In the two inner raceways B and C, however, the movement of the balls relative to the carriage is in the reverse direction, the balls in the top course which bear against the underside of the stationary cover plates moving rearwardly relative to the carriage, while those in the bottom course move forwardly. Upon reaching the rear ends of the raceways B and C, the balls 12 descend through the end notches to the lower course of their respective raceways where they travel forwardly until picked up by the front cap strip 35.

Under certain conditions it may be possible to dispense with the two preloading raceways B and C, retaining only the two load-carrying raceways A and D. In such a construction, the carriage would be prevented from moving away from the track in a vertical direction solely by the weight of the carriage and its burden. If the carriage is subjected to forces having upwardly directed complements, or to jarring impacts, or if it is subjected to vibration, it will usually be necessary to preload the carriage from above by pressure exerted on the balls in the top run of raceways B and C through the overhanging ledges 45 and 46. This is particularly true in motion picture apparatus wherein the intermittent motion of the film traversing mechanism may produce a discernible vibration in a vertical direction. Although the amplitude of such vibration may be very small, the error introduced thereby is multiplied many times when the picture is projected onto a distant screen.

While I have shown and described what I consider to be the preferred form of my invention, various changes in the shape and arrangement of the several parts will occur to those skilled in the art without departing from the broad scope of the invention as defined in the appended claims.

I claim:

1. A movable mount comprising, in combination, a stationary bed having a base portion with spaced parallel sides and overhanging ledges projecting inwardly from the sides thereof in spaced relation to the base portion, a carriage adapted for translatory movement with respect to said bed and having two oppositely projecting flanges extending into the spaces between said base portion and said ledges, each of said flanges being formed with a pair of laterally spaced V-shaped channels extending continuously around the flange in a fore and aft direction, channels formed in said base portion and the under surface of said ledges and cooperating with the channels in said carriage flanges to form raceways, one of the channels in said base portion being V-shaped and the others being flat bottomed, and a plurality of rolling elements disposed within said raceways, the rolling elements in the bottom course of one of each pair of raceways providing rolling support for said carriage on said bed, and the rolling elements in the top course of the other raceway of said pair engaging said ledge to apply a downward thrust on said carriage.

2. A movable mount comprising, in combination, a stationary bed including two parallel longitudinal channel members having upper and lower leg portions and disposed with the open sides of said channels facing each other, the inner surfaces of each of said legs being formed with a pair of laterally spaced longitudinally extending tracks, a carriage having two oppositely projecting flanges disposed between the legs of said channels, each of said flanges having formed thereon another pair of laterally spaced tracks each extending continuously around said flange in an end-to-end direction and in positions aligned with said first mentioned tracks to define a pair of upper raceways and a pair of lower raceways for each flange and channel, a plurality of rolling elements for each raceway, one of the tracks of each raceway being contoured to prevent lateral escape of said rolling elements while permitting longitudinal movement thereof, the rolling elements in the bottom course of one of each pair of raceways providing rolling support for said carriage on said bed, and the rolling elements in the top course of the other raceway of said pair engaging said upper leg portion to apply a downward thrust on said carriage.

3. A movable mount comprising, in combination, a stationary bed including two parallel longitudinal channel members having upper and lower leg portions and disposed with the open sides of said channels facing each other, the inner surfaces of each of said legs being formed with a pair of laterally spaced longitudinally extending tracks, a carriage having two oppositely projecting flanges disposed between the legs of said channels, each of said flanges having formed thereon another pair of laterally spaced tracks each extending continuously around said flange in an end-to-end direction and in positions aligned with said first mentioned tracks to define a pair of upper raceways and a pair of lower raceways for each flange and channel, a plurality of rolling elements for each raceway, one of the tracks of each raceway being contoured to prevent lateral escape of said rolling elements while permitting longitudinal movement thereof, the rolling elements in the bottom course of one of each pair of raceways providing rolling support for said carriage on said bed, the rolling elements in the top course of the other raceway of said pair engaging said upper leg portion to apply a downward thrust on said carriage, one of said raceways being defined by oppositely directed V-shaped grooves to hold said carriage against lateral movement, and one of the tracks of each of the other raceways having a horizontal plane surface engaging said rolling elements.

ROBERT P. SHEA.

REFERENCES CITED

The following references are of record in the file of this patent:

UNITED STATES PATENTS

| Number | Name | Date |
|---|---|---|
| 1,005,055 | Miller | Oct. 3, 1911 |
| 2,047,868 | Harley | July 14, 1936 |

FOREIGN PATENTS

| Number | Country | Date |
|---|---|---|
| 730,922 | France | 1932 |